W. A. LINQUIST.
AUTOMOBILE FENDER.
APPLICATION FILED JUNE 11, 1915.
1,180,304.
Patented Apr. 25, 1916.
3 SHEETS—SHEET 3.
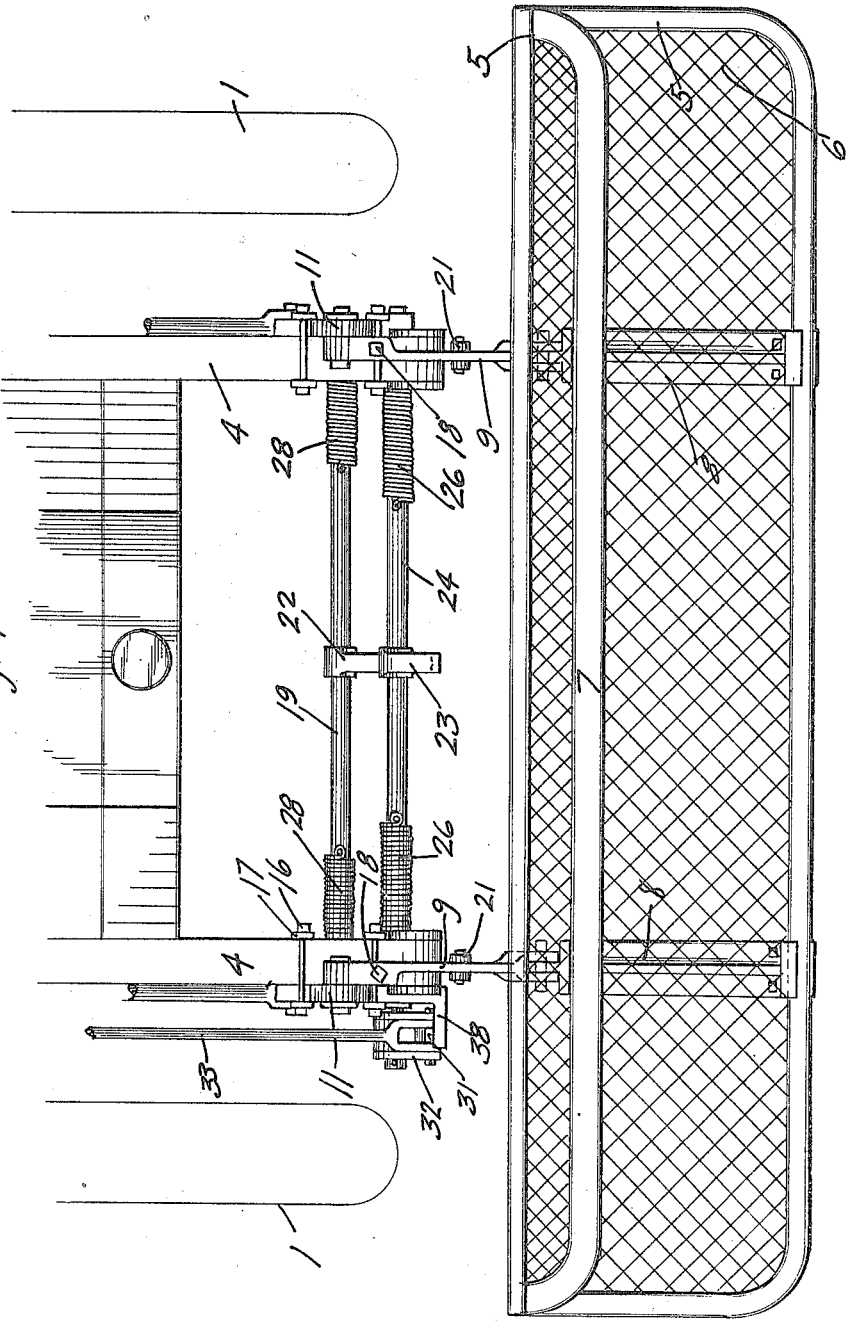
WITNESSES
E. C. Skinkle
Eva E. Konig
INVENTOR
WILLIAM A. LINQUIST
BY HIS ATTORNEYS

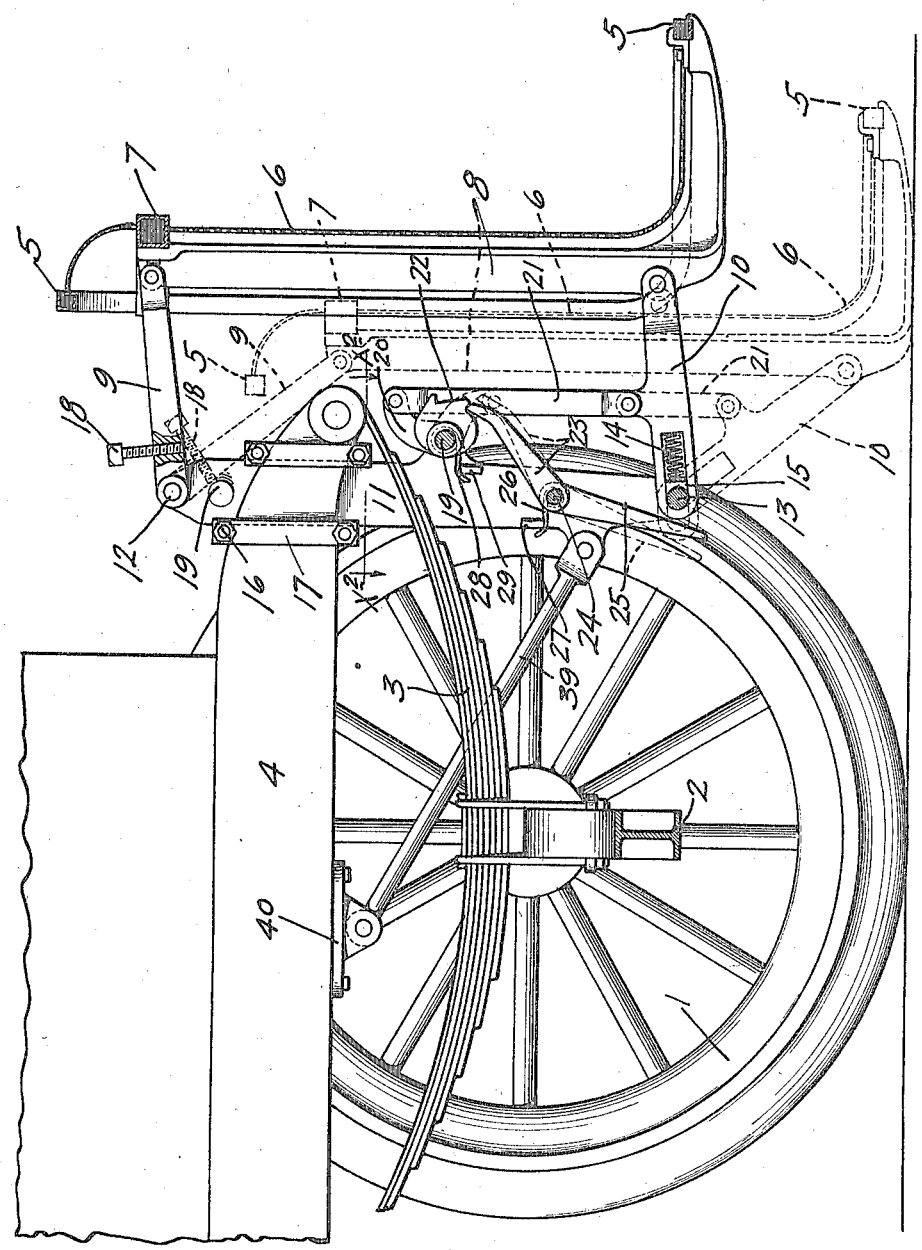

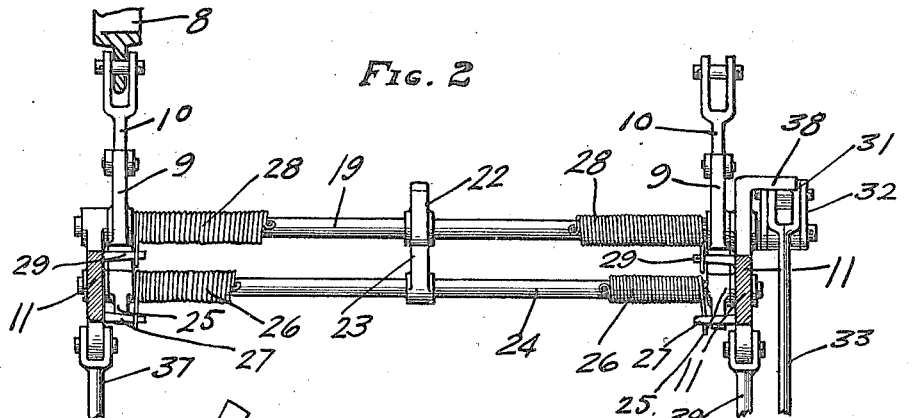
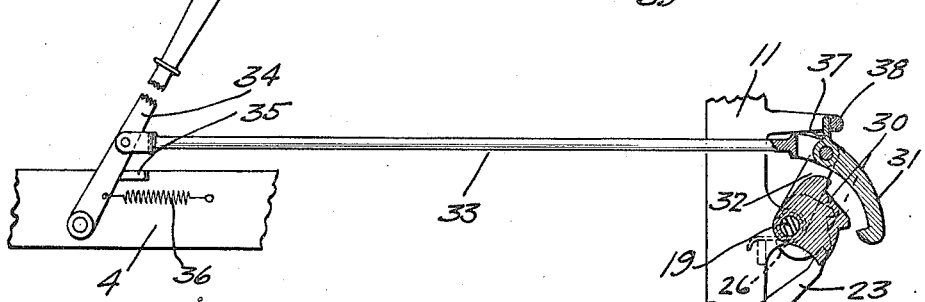
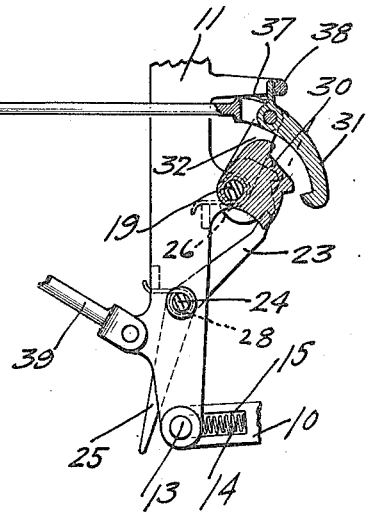

UNITED STATES PATENT OFFICE.

WILLIAM A. LINQUIST, OF MINNEAPOLIS, MINNESOTA, ASSIGNOR TO BERTRICE E. LINQUIST, OF MINNEAPOLIS, MINNESOTA.

AUTOMOBILE-FENDER.

1,180,304.      Specification of Letters Patent.      Patented Apr. 25, 1916.

Application filed June 11, 1915. Serial No. 33,476.

*To all whom it may concern:*

Be it known that I, WILLIAM A. LINQUIST, a citizen of the United States, residing at Minneapolis, in the county of Hennepin and State of Minnesota, have invented certain new and useful Improvements in Automobile-Fenders; and I do hereby declare the following to be a full, clear, and exact description of the invention, such as will enable others skilled in the art to which it appertains to make and use the same.

My invention relates to automobile fenders and is in the nature of an improvement on, or modification of the fender disclosed and claimed in my prior Patent 1,105,671, of date August 4, 1914.

Generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a view in vertical section and with some parts broken away and some parts in diagram showing my improved fender applied to an automobile of the ordinary construction; Fig. 2 is a detail in horizontal section taken on the line $x^2$ $x^2$ on Fig. 1; Fig. 3 is a fragmentary view partly in side elevation and partly in vertical section; and Fig. 4 is a plan view showing the fender and front portion of the automobile to which it is applied.

Of the parts of the automobile the numeral 1 indicates the front wheels, the numeral 2 the front axle, the numeral 3 the front springs, the numeral 4 the frame bars, which latter are supported on the springs 3 in the customary way. As preferably constructed, the fender proper comprises a marginal frame 5 bent into approximately rectangular form and having an L-shaped outline when viewed from the side of the machine. This frame is provided with a netting or filler 6, to the marginal portion of which it is rigidly secured. A transverse bar 7 is rigidly secured to the upper portion of the netting 6 and its ends are bent backward and secured to the upper portion of the vertical sides of the marginal frame 5. As shown, the marginal frame 5 and transverse bar 7 are of rectangular tubular form and are preferably made up of light channel bars secured, edge to edge, by rivets, bolts, or otherwise.

The numeral 8 indicates a pair of L-shaped brackets, the upright portions of which afford posts and the horizontal lower portions of which afford shoes adapted to engage the ground, or to be supported just above the ground when the fender is dropped. These brackets 8 are laterally spaced and the front ends of their shoe-forming portions are rigidly secured to the sides of the lower front bar of the marginal frame 5, while the upper ends of their upright portions are rigidly secured to the cross bar 7. The network 6 of the fender is located in front of the upright portions and above the horizontal lower portions of the said brackets. The upright portions of the brackets 8 are, as shown, made T-shaped in cross section with the webs projecting rearward and pivotally connected to the front ends of laterally spaced upper links 9 and to the front ends of laterally spaced lower links 10. The said links 9 and 10 are parallel and the rear ends thereof, are pivoted, respectively, to the upper and lower portions of fender supporting frames or uprights 11, which, in turn, are rigidly secured to the projecting front ends of the frame bars 4. The pivotal connections between the upper links 9 and the upper ends of the fender supporting frames 11 are preferably made by studs 12, while the rear ends of the lower links 10 are slotted so that they embrace a cross tie rod 13, the ends of which are rigidly secured to the lower ends of the said frames 11. Springs 14 placed in the slots of the links 10 re-act against the said links and against half bearings 15 and yieldingly force the said links, and hence, the lower portion of the fender forward.

The upper portions of the fender supporting frames 11 are adjustably, but rigidly and detachably secured to the front ends of the frame bars 4, by means of nut-equipped bolts 16 and coöperating clamping bars 17. The upper links 9 are provided with stop screws 18 that are engageable with stop lugs 19 on the upper portions of the frames 11, to limit the downward movements of the parallel links 9 and 10, and hence, the downward movements of the fender. Thus, the fender may be set so that it will strike the ground, or so that it will be stopped just above the ground.

Journaled in forward projections of the frames 11 is a rock shaft 19 which, at its ends, just inside of the frames 11, is provided with forwardly and upwardly projecting arms 20 that are connected by links 21 to the intermediate portions of the lower links 10. At its central portion, the rock shaft 19 is provided with a lock segment 22, which, as shown, has two teeth that are arranged to be engaged by the free end of a lock dog 23 secured to the intermediate portion of a rock shaft 24 journaled in the frames 11 below the rock shaft 19. At its ends, just inside of the frames 11, this rock shaft 24 is provided with depending trip arms 25, the lower ends of which stand just at the rear of the rear ends of the lower links 10. Torsion springs 26 anchored at one end to the rock shaft 24 and at its other ends to projections 27 on the frames 11 (see Figs. 1 and 2) puts the said rock shaft under strain to move in a direction to hold the lock dog 23 engaged with the lock segment 22. Similar torsion springs 28 anchored to the rock shaft 19 and to projections 29 on the adjacent frames 11 put the rock shaft 19 under a strain to move in a direction to throw the fender downward.

On one end of the rock shaft 19 is a so-called re-setting segment 30 which, as shown, also has two teeth. This segment 30 is adapted to be engaged by a hook-shape resetting dog 31 which, as shown, is pivoted to an arm 32 (see Figs. 2 and 3) loosely pivoted on the rock shaft 19, and connected to the front end of a resetting rod 33. The rear end of this rod 33 is shown as connected to a resetting lever 34 pivoted to one of the frame bars 4 and located in position to be engaged by the operator from the front seat. This lever 34 is normally held forward against a fixed stop 35 on the bar 4 by a coupling spring 36 attached thereto and anchored to the said bar 4. Normally, or when the parts are as shown in Fig. 3, a releasing lug 37 on the dog 31 engages a fixed stop 38 on the adjacent frame 11 and holds the hook end of the said dog free from the teeth of the segment 30.

To more rigidly secure the fender supporting frames 11 to the frame bars 4, thrust rods 39 are connected to the lower portions thereof and to bearings 40 on the said frame bars 4.

Operation: Normally, the lock dog 23 will be engaged with the lower tooth of the lock segment 22, and the fender will be held in a raised or normal position indicated by full lines in Fig. 1. When the lower front bar of the fender frame 5 strikes an obstruction, such, for example, as a person in front of the machine, the springs 14 will yield and permit the lower portion of the fender to move bodily rearward, thereby giving to the lower links 10 endwise rearward movements. Such rearward movements of the lower links 10 cause the rear ends thereof to strike the tripping arms 25 to thereby release the lock dog 23 from the lock segment 22, whereupon the fender will be automatically released and automatically thrown downward by the action of gravity, assisted by the force of the springs 28. Here it is highly important to note that the tripping action is produced by an initial rearward movement of the lower portion of the fender and that, as the fender drops after it is released from its lock device, it drops downward and is materially carried rearward, such movement being due to the fact that the links 9 and 10 move from approximately horizontal normal positions into forwardly inclined positions indicated by dotted lines in Fig. 1. This rearward movement is highly important because it gives the fender a chance to jump back away from the object struck and hence, to reach the ground or its lower-most position, before it is called upon to actually pick up the object that it has struck. This very greatly reduces the chances of the fender being caused to run over an object struck thereby.

In the drawings, means is not illustrated whereby the fender may be tripped by the operator before it has struck an object, but it will, of course, be understood that any connection whereby the tripping dog 23 may be oscillated from its normal position will accomplish this result.

Obviously, the fender may be re-set by hand, partly illustrated in Fig. 3 which makes it an easy matter for the operator on the seat to raise or re-set the fender. The initial rearward movement of the resetting lever 34 releases the lug 37 of the dog 31 from its stop 38 and permits the free end thereof to engage the lower tooth of the resetting segment 30, so that continued rearward movement of the said lever will oscillate the rock shaft 19 far enough to carry the first notch of the lock segment 22 into engagement with the free end of the lock dog 23. Then by another forward and then rearward movement of the said lever 34, the dog 33 will be engaged with the second or last tooth of the segment 30 and will oscillate the rock shaft 19 far enough to engage the lower tooth of the lock segment 22 with the lock dog 23, thereby resetting the fender in its normal or raised position.

It is highly important to note that the link 21 supports the fender with freedom for a pendulum like rear oscillatory movement, so that it is free, except for the position of the springs 14 for that initial rearward movement which is required to trip the lock dog 23 and drop the fender. Any arrangement wherein this initial rearward movement of the fender required to trip the fender lock, can take place only by giving considerable vertical movement to the fender is objectionable because the fender has considerable weight and any considerable lifting movement makes the tripping action difficult when as a matter of fact, the tripping action should be very sensitive.

What I claim is:

1. In a fender, the combination with fender supports, of a fender body, means including lower forwardly extended links, connecting said fender body to said fender supports, the said lower links being capable of initial rearward movements and being yieldingly pressed forward, and a lock for holding said fender body in a raised position, and arranged to be tripped when said lower links and the lower portion of the fender body are given initial rearward movement.

2. In a fender, the combination with fender supports, of a fender body, means including lower forwardly extended links, connecting said fender body to said fender supports, the said lower links being capable of initial rearward movements and being yieldingly pressed forward, and a lock for holding said fender body in a raised position, and arranged to be tripped when said lower links and the lower portion of the fender body are given initial rearward movement, the said lock being adjustable to hold said fender in different raised positions.

3. In a vehicle fender, the combination with supports therefor securable to the vehicle, of a fender body, upper and lower links supporting said fender from said supports, and means normally holding said fender body in a raised position.

4. In a vehicle fender, the combination with supports therefor securable to the vehicle, of a fender body, upper and lower links supporting said fender from said supports, means normally holding said fender body in a raised position, and which links stand in forwardly extended positions, when said fender body is raised, and cause the said fender body to move downward and rearward, when released.

5. In a vehicle fender, the combination with a fender body, of supports therefor securable to a vehicle, upper and lower links connecting said supports to said fender body, a lock normally holding said fender body raised with said parallel links in forwardly extended positions, and with the said links arranged to move said fender body downward and rearward when released.

6. In a vehicle fender, the combination with a fender body, of supports therefor securable to a vehicle, upper and lower links connecting said supports to said fender body, a lock normally holding said fender body raised with said parallel links in forwardly extended positions, and with the said links arranged to move said fender body downward and rearward when released, and the said fender comprising an automatic trip for said lock.

7. In a vehicle fender, the combination with a fender body, of supports therefor securable to a vehicle, upper and lower links connecting said supports to said fender body, a lock normally holding said fender body raised, with said parallel links in forwardly extended positions, and with the said links arranged to move said fender body downward and rearward when released, the said fender body having a portion yieldingly pressed forward and adapted for initial rearward movement to trip said lock.

8. The combination with a vehicle having the forwardly projecting frame bars and fender supporting frames secured to front ends of said frame bars, pairs of upward and lower links pivoted to said fender supports and projecting forward therefrom, the said lower links being yieldingly pressed forward and having a limited rearward movement, and fender proper carried by the front ends of said upper and lower links, and means for securing said fender and links in raised position and for dropping the same.

9. The combination with a vehicle having the forwardly projecting frame bars and fender supporting frames secured to front ends of said frame bars, pairs of upward and lower links pivoted to said fender supports and projecting forward therefrom, the said lower links being yieldingly pressed forward and having a limited rearward movement, and fender proper carried by the front ends of said upper and lower links, a rock shaft mounted on said fender supports and having upwardly projecting latterly spaced arms, upright links connecting said arms to said lower links, a dog engaging lock member of said upper rock shaft, and a lower second rock shaft below the first noted rock shaft provided with a lock dog engageable with the said dog engaging lock member of said upper rock shaft, and tripping arms on said lower rock shaft located in position to be engaged and pressed rearward of the rear ends of the said lower links.

In testimony whereof I affix my signature in presence of two witnesses.

WILLIAM A. LINQUIST.

Witnesses:
CLARA DEMAREST,
F. D. MERCHANT.